(12) United States Patent
Williams et al.

(10) Patent No.: US 6,887,584 B2
(45) Date of Patent: May 3, 2005

(54) SYSTEM AND METHOD FOR TWO SIDED SHEET TREATING

(75) Inventors: Joel Lane Williams, Troy, TX (US); Earl Soudelier, Gatesville, TX (US); Donald M. Marshall, Temple, TX (US); Robson Mafoti, Temple, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 0 days.

(21) Appl. No.: 10/603,010

(22) Filed: Jun. 24, 2003

(65) Prior Publication Data

US 2003/0232134 A1 Dec. 18, 2003

Related U.S. Application Data

(63) Continuation of application No. 09/267,493, filed on Mar. 12, 1999, now Pat. No. 6,610,358.

(51) Int. Cl.[7] .............................................. B32B 23/04
(52) U.S. Cl. ..................... 428/532; 478/534; 478/536; 478/537.5; 427/172; 427/206.4; 427/208.8; 427/211; 427/203; 427/348; 427/356; 427/358; 427/359; 427/361; 427/331; 427/428
(58) Field of Search ................................ 427/172, 211, 427/348, 356, 358, 359, 361, 391, 207.1, 208.4, 208.8, 428, 209; 428/532, 534, 536, 537.5

(56) References Cited

U.S. PATENT DOCUMENTS

| 1,835,741 A | 12/1931 | Allen |
|---|---|---|
| 2,118,549 A | 5/1938 | Cochrane, Jr. |
| 2,252,345 A | 8/1941 | Johnson |
| 2,309,090 A | 1/1943 | Bauer et al. |
| 2,325,798 A | 8/1943 | Porter |
| 2,347,643 A | 5/1944 | Schieman |
| 2,364,505 A | 12/1944 | Bennett |

(Continued)

FOREIGN PATENT DOCUMENTS

| CA | 2107277 | 5/1994 |
|---|---|---|
| EP | 0 511 129 | 10/1992 |
| EP | 0870872 | 12/2002 |
| GB | 1060155 | 3/1967 |
| JP | 00462761 | 1/1971 |
| JP | 60119296 | 12/1983 |
| JP | 61293231 | 12/1986 |
| JP | 052000745 | 8/1993 |
| WO | WO 94/12347 | 6/1994 |

OTHER PUBLICATIONS

Billmeyer, Jr., Fred W., "Text Book of Polymer Science", 3rd Edition, 1984, pp. 441–442.
European Search Report, dated Jun. 28, 2000 (App. No. EP 00 10 4402).
European Search Report, dated Jun. 28, 2000 (App. No. EP 00 10 4486).

*Primary Examiner*—Ieszek B Kiliman

(57) ABSTRACT

A system and a method for coating two sides of a laminate material is disclosed in which one side of the laminate material is coated with one substance and the second side is coated with a different substance. The method described is particularly suited for applying a substance providing characteristics desirable in the manufacturing process to one side of the laminate material and applying a substance providing characteristics desirable in the end product to the other side of the laminate material. For example, a release agent may be applied on one side of a kraft paper sheet and phenolic resin on the other side, thereby eliminating the need to use release sheets in the manufacture of laminates. The kraft sheet thus coated may be used in a laminate product.

38 Claims, 1 Drawing Sheet

U.S. PATENT DOCUMENTS

| | | |
|---|---|---|
| 2,766,807 A | 10/1956 | Marian |
| 3,196,038 A | 7/1965 | Schoch et al. |
| 3,215,579 A * | 11/1965 | Hagen .................... 156/289 |
| 3,231,418 A | 1/1966 | Muggleton |
| 3,320,086 A | 5/1967 | Rose et al. |
| 3,620,899 A | 11/1971 | Kelly et al. |
| 3,716,395 A | 2/1973 | Bauer et al. |
| 3,899,615 A | 8/1975 | Wallsten |
| 3,900,690 A | 8/1975 | Schwarz |
| 3,936,582 A | 2/1976 | Keiser |
| 3,983,307 A | 9/1976 | Power et al. |
| 4,064,297 A | 12/1977 | Power et al. |
| 4,158,712 A | 6/1979 | Degens |
| 4,172,160 A | 10/1979 | Stoner, III |
| 4,177,304 A | 12/1979 | Berry |
| 4,243,461 A * | 1/1981 | Jaisle et al. ............... 156/288 |
| 4,244,990 A | 1/1981 | Mayerhoffer |
| 4,267,240 A * | 5/1981 | Jaisle et al. ............. 428/484.1 |
| 4,311,748 A | 1/1982 | Casey et al. |
| 4,354,449 A | 10/1982 | Zink |
| 4,358,481 A | 11/1982 | Wallsten |
| 4,391,833 A | 7/1983 | Self et al. |
| 4,473,613 A | 9/1984 | Jaisle et al. |
| 4,499,125 A | 2/1985 | Blasing et al. |
| 4,510,199 A | 4/1985 | Brook |
| 4,533,600 A | 8/1985 | Coughlan et al. |
| 4,609,589 A | 9/1986 | Hosoda et al. |
| 4,629,634 A | 12/1986 | Coughlan et al. |
| 4,657,783 A | 4/1987 | Tatt et al. |
| 4,822,640 A | 4/1989 | Tuhkanen et al. |
| 4,853,255 A | 8/1989 | Onishi et al. |
| 4,961,964 A | 10/1990 | Dahlgren |
| 5,084,318 A | 1/1992 | Stirling et al. |
| 5,089,296 A | 2/1992 | Bafford et al. |
| 5,395,690 A | 3/1995 | Kawahata et al. |
| 5,492,722 A | 2/1996 | Tait et al. |
| 5,510,161 A | 4/1996 | Lloyd |
| 5,714,269 A | 2/1998 | Munzo Madrid |
| 5,753,871 A | 5/1998 | Kahara et al. |
| 6,001,490 A | 12/1999 | Reinacker et al. |
| 6,610,358 B1 * | 8/2003 | Williams et al. ............ 427/211 |

* cited by examiner

SYSTEM AND METHOD FOR TWO SIDED SHEET TREATING

CROSS-REFERENCE TO RELATED APPLICATIONS

This application is a Continuation of U.S. patent application Ser. No. 09/267,493 entitled SYSTEM AND METHOD FOR TWO SIDED SHEET TREATING filed Mar. 12, 1999, now U.S. Pat. No. 6,610,358 the disclosure of which is incorporated hereby by reference. The present application is also related to now abandoned U.S. patent application Ser. No. 09/267,180, now abandoned also entitled SYSTEM AND METHOD FOR TWO SIDED SHEET TREATING, which was commonly assigned and concurrently filed with the aforementioned parent application. The disclosure of parent U.S. patent application Ser. No. 09/267,493 U.S. incorporated U.S. patent application Ser. No. 09/267,180 by reference. Thereby, the disclosure of U.S. patent application Ser. No. 09/267,180 is incorporated herein by reference.

TECHNICAL FIELD

The present invention relates generally to the manufacture of laminate products such as may be used for decorative flooring, counter and table tops, and wall panels, and more specifically to systems and methods for manufacturing such products by applying a coating of the same or different materials on opposing sides of a laminate material.

BACKGROUND OF THE INVENTION

The ability to replicate natural materials has substantially improved over the years. For example, decorative laminates have replaced natural materials in the construction of furniture, cabinets, counter tops and other surfaces. In each of these applications, a decorative surface may be applied to a core layer or substrate, namely, plywood, particle board, chipboard, medium density fiberboard, etc. Often, a backing layer is secured to the opposite side of the substrate to balance the laminates or provide other benefits.

Generally, the decorative surface and the backing layer will include one or more kraft paper layers which are adhesively laminated together using various materials, such as melamine formaldehyde and phenolic resins. For example, a high pressure decorative laminate may comprise a very thin overlay sheet impregnated with melamine resin and having aluminum oxide grit to provide for abrasion resistance, a decorative sheet disposed thereunder, and several sheets of kraft paper impregnated with phenolic resin disposed below the decorative sheet.

Typically, in prior art systems, sheets of kraft paper are impregnated with phenolic resin by submerging them in a vat which is filled with phenolic resin and then curing the phenolic resin impregnated kraft paper. The kraft paper soaks up a desired amount of phenolic resin based on the time it is left in the vat and the level of submergence. This method of impregnating the kraft paper is generally not cost effective as it requires large vats providing substantial resin pool surface areas in order to allow the proper immersion of a portion of a continuous roll of kraft paper. These large pool surface areas result in wasteful use of phenolic resin as the large vat surface area is prone to collection of contaminants and to the escaping of resin vapors thus causing variations in the percentage of solids and/or other controlled attributes of the resin requiring substantial portions of the resin to be disposed of from time to time. Moreover, when the resin impregnated kraft paper is being manufactured using such vats, fumes are created during the process which are harmful to the workers in the vicinity of the manufacturing process. All of this is compounded by the fact that such vats of phenolic resin, or other resins, are difficult to clean requiring an inordinate amount of time to properly clean the vats that have been used for impregnating the kraft sheets with phenolic resin.

Conventional laminates are produced by applying heat and pressure to an assembly of laminate material, which typically comprises a plurality of phenol formaldehyde resin impregnated kraft paper sheets, a melamine formaldehyde resin impregnated decorative sheet, and optionally a melamine formaldehyde resin impregnated overlay sheet in a multi-opening press at high temperature and pressure. The different layers or sheets will be mechanically bonded due to the cross link between the resins caused by the heat and pressure.

The laminates which are manufactured by using the kraft paper sheets as described above are made by a bulky manufacturing press which is expensive to operate. Thus, it is not cost effective or desirable to use the press to produce individual laminates. Therefore, in the typical manufacturing process a plurality of laminates are produced from each press during each press cycle to make the most efficient use of the press. As shown in FIG. 1, each laminate assembly 11 may commonly comprise of a melamine overlay layer 12 incorporating $AlO_2$ for wear resistance, a pattern layer 13, and two layers 14 and 15 of phenolic resin impregnated kraft paper.

Typically, in such a press system pairs of such laminate assemblies are positioned back-to-back with the phenolic resin impregnated kraft paper sheet 15 of one laminate assembly facing the phenolic resin impregnated kraft paper sheet of a second laminate assembly. Pairs of laminate assemblies are separated from the other by metal sheets or press plates. However, when the laminate assemblies are pressed together, the different laminate assemblies would stick together if not provided with a release mechanism because the phenolic resins impregnated in the back-to-back kraft paper sheets of the two laminate assemblies would cross link to provide a mechanical bond between the sheets.

Therefore, typically during the manufacturing process each laminate assembly 11 also includes a sheet, known as release sheet. The release sheet is usually kraft paper which has been coated with a release agent on at least one side. This release sheet is placed at the end of each laminate assembly, adjacent to the phenolic resin impregnated kraft paper layer 15, away from the press plates, to provide a release mechanism between the paired laminate assemblies. The release sheet facilitates easy separation of the laminate assemblies after pressing, as the release agent will not allow cross linking of the laminate assemblies, at least with respect to the side of the laminate assembly to which the release sheet is applied.

Typically due to the heat and pressure applied during the pressing process the release sheet sticks to the phenolic resin impregnated kraft paper layer disposed on a side of the release sheet not treated with the release agent as the phenolic resin in this sheet will migrate under heat and pressure into at least a portion of the release sheet to provide structural cross linking. Accordingly, the release sheet generally adds to the thickness or bulk of the laminate. However, due to the presence of the release agent on the other side of the release sheet, the pressed laminate assemblies may then be separated from each other and the side of the kraft paper with the release sheet is sanded to remove the release agent from the surface of the release sheet.

The use of the release sheet during pressing of laminate assemblies as described above and the subsequent sanding of the release agent coated surface presents certain disadvantages. In order to achieve the desired thickness of the laminate assembly and still allow the use of a discrete release sheet to facilitate separation of the laminate assemblies, more sheets of thinner material instead of fewer sheets of thicker material have to be used. This increases the manufacturing overhead as a greater number of sheets have to be handled and processed before they can be used in the laminate assembly. Such handling and processing may include impregnating the sheets with phenolic resin, cutting the sheets to the desired size, and collating the sheets for subsequent pressing. Also, the release sheet itself has to be coated with a release agent, cut to the desired size and collated with the other sheets.

Furthermore, since the release sheet becomes part of the laminate after pressing, at least one sheet of the laminate does not include phenolic resin saturation, but rather relies on migration of the resin from an adjoining sheet. Thus, prior art systems do not provide consistent structural bonding between the different layers of the laminate. Moreover, in order to remove all the release agent from the laminate assembly, it might be necessary to sand more than just the surface of the release sheet. Thus, laminate assemblies obtained by this process may not have a consistent thickness from one laminate assembly to another and also cause wastage of material.

The conventional laminates produced by the above described prior art systems may then be cut to size and employed in a variety of applications such as decorative surfaces for desktops, tabletops, wall panels, and the like such as by bonding them to a core layer or substrate with a conventional adhesive such as contact cement. These laminates may also be used as backer layers common in laminated flooring products.

It should be clear that the use of the release sheet contributes substantially to the cost of the manufactured laminate and also adds to the product cycle time. Not only are there raw material costs involved with the use of a separate release sheet, but also substantial undesirable processing costs are inherent with the use of the release sheets.

Thus, there is a need in the art for a system and method of manufacturing laminates using the advantages offered by bulk pressing the laminates without introducing unnecessary costs, handling steps, or structural disadvantages attendant with the use of prior art release sheets.

BRIEF SUMMARY OF THE INVENTION

The present invention is directed to a system and method for coating different surfaces of laminate material, such as a sheet of kraft paper, with materials having desired characteristics.

Accordingly, in an embodiment of the present invention, one side of a kraft paper or other laminate material used in constructing a laminated product is coated with a substance having a particular characteristic desirable during the manufacturing process, although such a characteristic may not be particularly desirable in the finished laminated product. For example, it is often desirable that a side of the kraft paper which comes in contact with another laminate assembly during the manufacturing process be coated with a release agent. For example, a commonly used release agent is sodium alginate, such as kelgin, manufactured by Monsanto Company. Sodium alginate has been found to provide superior release, or cross link avoiding properties, when disposed between laminate materials having phenolic resin thereon. Thus, sodium alginate, may be used as a release agent during the manufacturing process of decorative laminates and therefore may be provided as a coating on the kraft paper in accordance with the present invention. However, any release agent may be used without departing from the scope of the present invention.

According to an embodiment of the invention, another side of the kraft paper is coated with a substance having characteristics desirable in the end product. For example, with decorative laminates it may be desirable to coat an opposing side of the kraft paper with phenolic resin in order to provide desired mechanical bonding with additional layers of kraft paper or other laminate material.

Although described above with respect to the use of sodium alginate as a release agent, it should be appreciated that any release agent may be used without departing from the spirit of the present invention. Moreover, there is no limitation as to the use of a release agent according to the present invention, as other materials, such as lubricants, wetting agents, drying agents, and the like may be useful in the manufacturing of such products although not desired for the finished product. Likewise there is no limitation to the use of phenolic resin on a second side of the laminate material and any material providing a characteristic desirable in the end product may be used. Also, if desired, the second side of the sheet may be left uncoated.

Preferably, reverse roll coating in which a roll of paper is unwound and passed over a series of rollers such that one side of the paper is treated with a substance having characteristics desirable in the manufacturing process and the other side is treated with a substance having characteristics desirable in the end product, is used to provide precisely controlled application of desired materials to the laminate material. However, although reverse roll coating is used in one embodiment, any process suitable for precisely treating different surfaces of a laminate material may be used according to the present invention.

The present invention provides advantages not available in the prior art. For example, the laminate material so treated serves the function of a release sheet in a laminate assembly, eliminating the need for a separate release sheet during the manufacture of laminates. Thus, after the laminate assemblies have been cured under high pressure and heat, the cured laminate assemblies may be easily separated. The release agent may then be removed from each laminate assembly, such as by sanding, and the laminate assembly used in an end product. Thus, the overhead associated with the raw material costs, handling, and coating of the release sheets is eliminated while providing desired attributes in the laminated assembly. For example, one embodiment, wherein phenolic resin is provided on a side of this sheet, results in a final sheet in the laminate assembly having structural attributes consistent with those of the other laminate materials of the laminate assembly, due to this sheet utilized for providing the release functionality also having the phenolic resin.

Additionally, since the release sheet which added to the thickness of the laminate is no longer used, the total number of laminate materials used may be further reduced by combining fewer laminate materials of increased thickness to achieve the desired thickness of the laminate. For example, a prior art laminate may be required to use thinner sheets of laminate material to produce a laminate of the desired thickness, as these sheets are typically provided in particular thicknesses which, when divided to provide a desired total thickness from multiple sheets, one of which being the needed discrete release sheet, dictate that a particular number of sheets be used. However, the present invention would allow thicker sheets of laminate material to be used instead, as there is no need for a discrete release sheet to be accounted for in the total thickness of the laminate assembly, and therefore sheets having a greater thickness may be utilized to provide the desired total laminate assembly thickness. Furthermore, the thicker sheets themselves may be less expensive than the thinner sheets since fewer sheets have to be handled at the plant where these sheets are manufactured. Also, the thicker sheets are easier to handle than the thinner sheets, and are less easily torn, thus reducing wastage due to scrap during handling. Furthermore, fewer sheets are now required to be cut to the desired size and there is less handling and lay up costs at the laminate manufacturing plant. The present invention also provides more control of the final thickness of the laminate since the thickness of the laminate materials used may now be selected without concern for the thickness of a release sheet which must be accounted for in the total thickness of the laminate assembly but which cannot be relied upon for providing the mechanical integrity of the sheets treated to provide the above mentioned cross linking.

Therefore, it is an object of the present invention to provide a system and method for coating a sheet with different materials on two different surfaces of the sheet.

It is another object of the present invention to coat one surface of a sheet with a material to provide characteristics desirable in the manufacturing process to reduce the cost of the end product. It is separate object of the present invention to coat another surface of the sheet with a different or similar substance to provide characteristics that are necessary or desirable in the end product.

It is a further object of the present invention to provide a single sheet with a characteristic desirable in the manufacturing process and a characteristic that is desirable in the end product thereby providing both benefits in a single sheet and at the same time reducing costs associated with wastage and handling of the sheets.

It is a still further object of the present invention to provide a system and method for two sided coating a kraft paper such that one side is coated with a release agent and the other side is coated with phenolic resin thereby eliminating the need to use release sheets in the manufacture of a laminate to provide a more cost efficient manufacturing process.

It is a still further object of the present invention to reduce the cost of producing laminates and also to reduce the production cycle by eliminating unnecessary steps from the manufacturing process of the prior art.

It is a still further object of the present invention to provide a method and system of producing laminates without the need to use release sheets.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
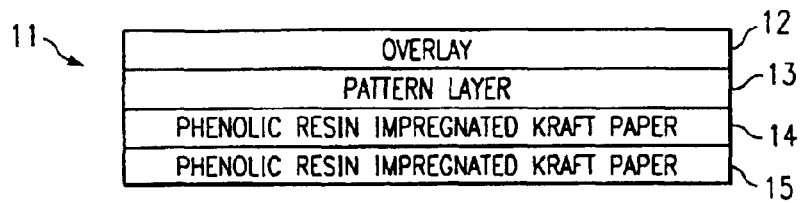
FIG. 1 shows a schematic of a laminate assembly with the different layers of laminate material.
Figure 2:
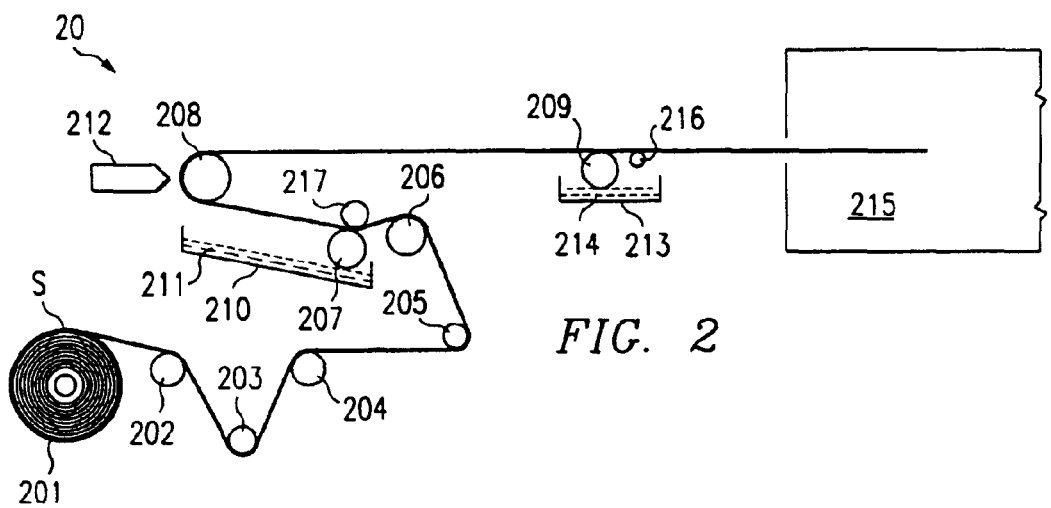
FIG. 2 shows a system for reverse roll coating a sheet with two substances on different surfaces of the sheet.

FIG. 2 shows an embodiment of system 20 for applying substances to opposing surfaces of a sheet S. The system comprises, a sheet S in the form of a roll 201, a series of rollers 202, 203, 204, 205, 206, 207, 208, 209, and 217, two pans 210, 213, metering devices 212, 216 and a curing device 215 such as may be an oven for applying a controlled amount of heat for subsequent curing of a coating substance. Pans 210 and 213 contain substances 211 and 214, respectively. Substances 211 and 214 may be the same substance or they may be different substances that are applied on different surfaces of sheet S. Metering devices 212 and 216 control the amount of substance 211 and substance 214, respectively, remaining on sheet S.

Sheet S is unwound and passed along rollers 202, 203, 204, 205, 206, 207, 208, 209 and 217 to curing device 215. Rollers 207 and 209 are coating rollers adapted to rotate within pans 210 and 213. Coating roller 207, which is adapted to be partly or totally submerged in substance 211 contained in pan 210, may be used to coat one side of sheet S. Similarly, coating roller 209, which may be adapted to be partly or totally submerged in substance 214 contained in pan 213, may be used to coat the other side of sheet S. Rollers 202, 203, 204, 205, 206 maintain a uniform tension on the surface of sheet S and prevent it from slacking and/or tearing. The tension on sheet S may be varied by adjusting the speed of the rollers and/or the pressure exerted thereon by idle rollers 202, 203, 204, 205, and/or 206. Furthermore, although a series of rollers 202, 203, 204, 205, 206, 207, 208, 209 and 217 are shown in at least one embodiment, the operation of the present invention does not require that all these rollers be used. For example, only select ones of these rollers may be provided depending on the desired tension and pressure to be applied on sheet S.

Substance 211 is fed into pan 210 by means of a pump (not shown). The level of substance 211 in pan 210 may be controlled by the pump such that the pump automatically feeds more substance 211 to pan 210 whenever substance 211 falls below a certain level. Roller 207 may be submerged in substance 211 up to a desired level depending on the amount of substance 211 needed to coat one side of sheet S. Moreover, the desired amount of substance 211 to be coated on one side of sheet S may also be controlled by the pump. Thus, when coating roller 207 rotates in pan 210, the surface of roller 207 is coated with substance 211 and when the first surface of sheet S comes in contact with roller 207, roller 207 coats the first surface of sheet S with the desired amount of substance 211. Moreover, by varying the speed of the rollers the amount of time that different parts of sheet S remain in contact with roller 207 may be controlled, thus, further controlling the amount of substance 211 that is applied to different parts of sheet S. Similarly, by increasing/decreasing the pressure at which sheet S engages roller 207, the amount of substance 211 that is applied may be varied. This pressure may be adjusted, for example, by adjustment to the aforementioned tension of sheet S.

Furthermore, as shown in FIG. 2, sheet S passes between coating roll 207 and roller 217 such that one surface of sheet S is in contact with roller 207 and the other surface is in contact with roller 217. Roller 217 may be used to apply pressure on sheet S, to ensure that sheet S touches coating roller 207. Since the position of roller 217 is adjustable it may be used to control the amount of substance 211 to be coated on sheet S. Roller 217 may also be used to apply pressure on sheet S such that substance 217 penetrates sheet S up to a desired level. Also, if desired, the position of roller 217 may be adjusted such that it does not apply any pressure on sheet S and thus sheet S may totally bypass substance 211. That is, by adjusting the position of roller 217, one surface of sheet S may be left uncoated.

Although in embodiments sheet S coming is described as coming into contact with roller 207, it should be appreciated that operation of the present invention does not require such contact. For example, roller 207 may be adapted to transfer coating material without contact to sheet S, such as through the use of rotational speeds sufficient to eject coating material onto the surface of sheet S. Additionally or alternatively, non-roller coating techniques may be used, such as the use of spray nozzles, brush bristles, or the like.

In the illustrated embodiment, sheet S passes around roller 208 which is positioned after roller 207 and changes the orientation of sheet S such that the second side of sheet S touches coating roller 209. Metering device 212 preferably located near roller 208 in order to take advantage of the disposition of the surface of sheet S provided thereby, may be used to further control the amount of substance 211 remaining on sheet S. Thus, once sheet S has been coated on one side, the amount of substance 211 remaining on sheet S may be further and precisely controlled to maintain a desirable amount of the substance on the surface of sheet S. Thus, if desired, metering device 212 may be adjusted, such as by being moved towards roller 208, thereby reducing the amount of substance 211 remaining on sheet S. The excess of substance 211 that is removed from sheet S is caught in pan 210. On the other hand, if desired, the amount of substance 211 remaining on sheet S may be increased by adjusting metering device 212, such as by increasing the distance of metering device 212 from roller 208. Furthermore, metering device 212 may be used to achieve a desired penetration of substance 211 into sheet S, such as by adjusting device 212 to apply pressure to the sheet surface.

According to the illustrated embodiment, sheet S is made to pass over coating roller 209 such that the second surface of sheet S touches coating roller 209. Coating roller 209 is located such that, if desired, it may be submerged partially or totally in substance 214 contained in pan 213. Substance 214 is fed into pan 213 by means of a pump (not shown). The level of substance 214 in pan 213 may be controlled by the pump, such that when coating roller 209 rotates in pan 213, the surface of roller 209 is coated with a desired amount of substance 214. Thus, when the second surface of sheet S comes in contact with roll 209, roll 209 coats the second surface of sheet S. Moreover, by varying the speed of the rollers the amount of time that sheet S remains in contact with roller 209 may be controlled, thus, controlling the amount of substance 214 that is applied to sheet S. The speed of the rollers may also be controlled to apply a desired pressure on the second surface of sheet S by roller 209 to achieve a desired penetration level for substance 214. As with roller 207 described above, there is no limitation to the use of contact between roller 209 and sheet S in coating the second surface of sheet S. Additionally, also as described above with respect to roller 207, coating of the second surface may utilize non-roller techniques.

A second metering device 216 is preferably provided in close proximity to coating roller 209 to precisely control the amount of substance 214 remaining on the second side of sheet S. Therefore, if desired, sheet S may be passed over metering device 216 such that the second surface of sheet S touches metering device 216. Although shown in the embodiment of FIG. 2 as a different mechanism than metering device 212, metering device 212 and 216 may similar mechanisms, if desired. Additionally, metering device 216 may be disposed near a reverse roller, as is metering device 212, disposed after coating roller 209 and/or metering device 212 may be disposed at a location other than near a reverse roller, if desired.

Sheet S is then preferably subjected to a B-curing process or other conditioning step to preferably condition substances 211 and 214, such as by drying or curing. For this purpose, sheet S may be passed through a conditioner 215. The environment inside conditioner 215 may be controlled such that, if desired, different temperatures, pressures, catalysts, or the like may be maintained on opposite sides of sheet S or at different points within conditioner 215, to facilitate efficient curing of substances 211 and 214. Since substances 211 and 214 may be different substances, it is desirable to control the environment inside conditioner 215 such that substance 211 and substance 214 are cured based on their respective desired characteristics. For this purpose, different heating elements, for example, may be provided in different parts of conditioner 215 such that one part of conditioner 215 is more suitable for curing substance 211 and another part of conditioner 215 is more suitable for curing substance 214. For example, when a release agent such as sodium alginate is used as substance 211, it may be desirable to keep the sodium alginate on the surface of sheet S and thus it may be desirable to cure sodium alginate more rapidly such as by exposing the sodium alginate to a higher temperature initially. Accordingly, different heating elements may be provided on different sides of sheet S to heat the two surfaces differently. For example, a cooling surface may be provided on the first side and a heating surface may be provided on the second side.

Furthermore, if desired an optimum temperature, or other conditioning attribute, which is to be applied in combination with the precisely controlled application of each coating material according to the present invention, may be calculated such that both substance 211 and substance 214 are cured to an acceptable degree. The acceptable degree of curing may be determined based on the ultimate use of sheet S. For example, it might be acceptable to cure substance 211 on the first side of sheet S to a lesser degree in order to obtain a better curing of substance 214 applied to the second side of sheet S depending on the particular application.

Although, conditioner 215 has been described as a single apparatus, a series of apparatus may be used to achieve the desired curing of the substances, if desired. For example, the series of apparatus may be a combination of conditioners, refrigerators, wetting devices, drying devices etc. Moreover, it may be desirable to control a combination of conditions, such as the temperature, the pressure, moisture level, etc., inside the conditioner to achieve a desired result, such as a desired penetration level of sheet S by either or both of substances 211 and 214.

In various embodiments, sheet S is a laminate material, such as kraft paper, that is used in the manufacture of laminates, such as decorative laminates and/or backer layers. Furthermore, although sheet S is preferably wound in the form of a roll, for purposes of this invention it is not necessary that the sheet be so wound.

As noted, substance 211 may be any substance. However, in various embodiments, substance 211 is a substance having characteristics desirable during the manufacturing phase of an end product. For example, during the process of manufacturing laminates, it is desirable that the outermost layer of each laminate assembly be coated with a release agent on one side, i.e., the side facing the other laminate assembly so that the laminate assemblies do not bond with each other during curing under high pressure and temperature, thus eliminating the need to use a release sheet during manufacturing. For example, as discussed above, a commonly used release agent is sodium alginate, such as kelgin, which provide superior release, or cross link avoiding properties, when disposed between laminate materials having phenolic resin thereon. Thus, sodium alginate, may be used as a release agent during the manufacturing process of decorative laminates and therefore may be provided as a coating on the kraft paper in accordance with the present invention. However, any release agent may be used without departing from the scope of the present invention. Furthermore, other materials providing characteristics desirable during the manufacturing phase, such as lubricants, wetting agents, drying agents may be used as substance 211 without departing from the scope of the present invention.

Similarly, substance 214 may be any substance. In various embodiments, substance 214 is a substance providing characteristics desirable in the end product. For example, in a laminate it is often desirable that the layers of a laminate assembly be coated with phenolic resin to provide structural bonding with other laminate materials. Thus, in the above example sheet S is coated on one side with a release agent and on the other side with phenolic resin and therefore, in the above example, substances 211 and 214 are different substances.

Metering device 212 may be any device capable of precisely controlling the amount of substance 211 that remains on the first side of sheet S. In various embodiments, metering device 212 is an air knife which is used to manipulate the coating on the first side of sheet S, i.e. to precisely control the amount of coating material remaining on the surface by removing excess coating of substance 211 from the first surface of sheet S. Thus, various embodiments, metering device 212 comprises a sheet of air projected under pressure at an angle from a slot-shaped air nozzle onto the coated surface of sheet S. Thus, while sheet S is supported on a moving support such as reverse roller 208, the sheet of air is projected onto sheet S so that the air strikes sheet S at an angle such that a desired amount of substance 211 may be removed from sheet S.

The amount of substance 211 remaining on sheet S maybe adjusted by controlling how much air is blown across the surface of sheet S, the force of the air blown across the surface of sheet S, the angle at which the sheet of air strikes the surface of sheet S, and/or the time during which the air knife engages the surface of sheet S, i.e. the speed at which the sheet is moved past the air knife and/or the time transpiring between the application of the coating substances and the engaging of the air knife. For example, by increasing the distance of metering device 212 from roller 208 the amount of substance 211 remaining on the first side of sheet S may be increased due to the striking force of the sheet of air of various embodiments air knife, against the surface of sheet S being reduced. Accordingly, various embodiments includes, a set of screw adjusters which are provided at the end of metering device 212 to adjust its distance from sheet S. However, any means may be used to adjust the distance of the metering device from the surface of sheet S, e.g., a pneumatic mechanical adjuster, an eccentric and follower, an electrically powered adjusting means such as a computer controlled servo mechanism, etc. Furthermore, the air pressure applied by various embodiment metering devices 212 may be adjusted to control the amount of substance 211 that penetrates sheet S at a particular advance speed of sheet S through the coating apparatus. For example, when a release agent is coated on the first side of sheet S, it is desirable that the release agent stay substantially on the surface of the sheet to facilitate its easy removal by sanding. Thus, by controlling the air pressure applied by metering device 212, such that the pressure is, for example, between 0.25 psi and 5 psi at an advance rate of 5–300 ft/min for sheet S, the sodium alginate release agent of various embodiments may be maintained substantially on the surface of the sheet.

Figure 4:
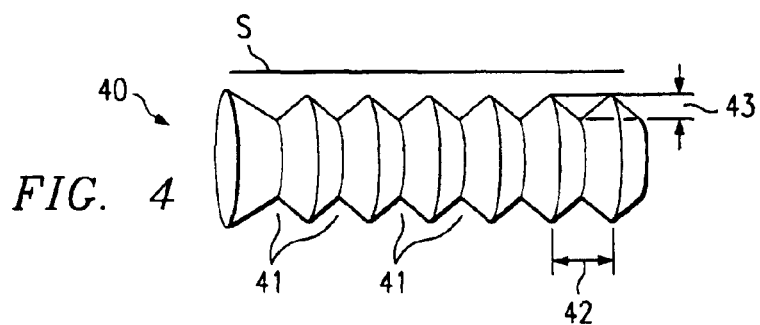
FIG. 4 shows a schematic of a metering device adapted for use according to the present invention.

Metering device 216 of illustrated embodiment in FIG. 2 is in the form of a bar or rod 40 shown in FIG. 4, that drags on the surface of sheet S. Grooves 41 may be provided on metering device 40 such that when sheet S passes over rod 40, some amount of substance 214 may be removed from sheet S. By changing the spacing 42 of the grooves 41 on the metering device, the amount of substance 214 remaining on sheet S may be controlled. For example, when the metering device has no grooves and is substantially smooth, a large amount of substance 214 may be removed from sheet S. On the other hand, by providing grooves on metering device 216 and selecting their size 43 and spacing 42, the amount of substance 214 removed from sheet S may be decreased. Although, metering device 216 (of FIG. 2) described above has been discussed with respect to a rod with grooves, any device capable of producing the desired precise control of coating material may be used for this purpose.

In various embodiments, it is desirable that the release agent stay mostly on the surface of the kraft paper. Therefore, metering device 212 is preferably an air knife because an air knife has been found to provide far superior accuracy as compared to other metering devices, such as the above described bar with grooves. On the other hand, it is desirable in various embodiments that the phenolic resin penetrate sheet S such that sheet S is substantially impregnated with the phenol formaldehyde resin while not saturating the sheet to a point that the second substance is contaminated, repelled, or otherwise adversely affected. Therefore, metering device 216 is preferably a bar with grooves as the grooved bar also facilitates impregnating sheet S with phenolic resin up to the desired level.

As mentioned above, the speed of the rollers or other mechanism for controlling the throughput of sheet S may be controlled to coat the sheet with a desired amount of substances 211 and 214. In various embodiments, the rollers rotate between 5–300 ft/min so that the desired amounts of substances 211 and 214 may be applied to the sheet.

Furthermore, due to the application of substance 211 on the first surface of sheet S, sheet S might curl or otherwise be physically altered before it is coated with substance 214 on the second surface. Therefore, the speed of the rollers may have to be further controlled in order to prevent undesired interaction of such physical alterations of sheet S. Metering device 216 may also be utilized to help prevent undesired interactions of these physical alterations, such as the aforementioned curling, by controlling the amount of substance 214 that remains on the second surface of sheet S.

In various embodiments, it is desirable that the same amount of release agent be applied on the entire surface of sheet S to provide a uniform coating of the substance. Thus, coating roller 207 has to be uniformly coated with substance 211, and therefore the level of substance 211 in pan 210 is preferably precisely controlled to provide a consistent delivery of coating substance along a run of sheet S. In various embodiments, the amount of sodium alginate applied on the surface of sheet S is between 0.5–5 grams per square foot depending on the particular application.

However, it is not desirable that the phenolic resin that is absorbed by sheet S from the second side penetrate the first side of sheet S. In general, the amount of the second applied substance 214 absorbed by sheet S is dependent to at least a certain extent on the amount of the first applied substance 211 absorbed. Therefore, in various embodiments, the release agent is coated to the surface of sheet S before the phenolic resin, as the release agent is controlled according to the present invention to remain substantially on the surface of the sheet and, therefore, limits its interaction with the application of the second substance. Thus, to avoid the release agent from being repelled by the phenolic resin, in various embodiments the release agent is applied to sheet S before the phenolic resin. However, it is not necessary that the release agent be applied first, and phenolic resin may be applied before the release agent without departing from the scope of the present invention.

Furthermore, the level of penetration of substances 211 and 214 and the saturation level of sheet S may be controlled by controlling various parameters inside conditioner 215. Thus, it may be desirable to determine a desired curing cycle for curing sheet S to obtain the necessary saturation level of each substance. For example, in order to achieve the desired curing, sheet S may be passed through different stages of curing so that a first stage provides an optimum environment for curing one substance, such as a substance most prone to undesired migration, and a subsequent stage provides an optimum environment for curing the other substance, such as a substance less likely to migrate.

In various embodiments, the ratio of the release agent to the phenolic resin is approximately 1:2. However, this ratio may be varied depending on the end use of the laminate. For example, when the laminate is used as a counter top, the ratio may be different than when the laminate is used as a flooring panel or as a backer layer. Moreover, the amount of release agent may be between 1–15% and the amount of phenolic resin may be between 15–30%.

Figure 3:
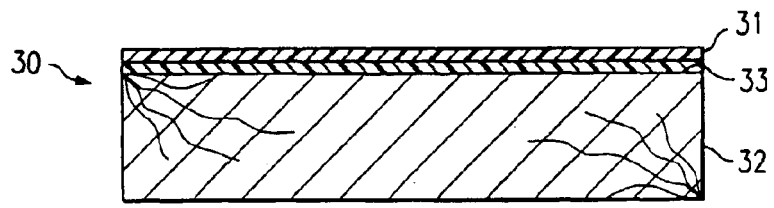
FIG. 3 shows a schematic of a sheet that has been coated on both sides according to the present invention.

FIG. 3 shows a schematic of a sheet of at least one embodiment that has been coated on each side with a different substance. Substance 31 is coated on one side of sheet 30 as shown so that substance 31 remains substantially on the surface of sheet 30. Sheet 30 is coated on an opposing surface with substance 32 which penetrates sheet 30 up to a desired level 33 as shown.

In order to adjust system 20 to the desired settings to enable coating the surfaces in the proper ratio according to various embodiments, the bone dry weight of sheet S is first determined. One side of sheet S is then coated with substance 211 and metering device 212 and conditioner 215 adjusted until the system is capable of curing substance 211 to a desired level such as a desired percentage weight of substance 211 as determined from a comparison of the coated weight of sheet S and the bone dry weight of sheet S. Sheet S is then treated only on the second side with substance 214 and metering device 216 and conditioner 215 adjusted until the system is capable of curing substance 214 to the desired ratio again as a desired percentage weight of substance 214 as determined from a comparison of the coated weight of sheet S and the bone dry weight of sheet S. Furthermore, in addition to the metering devices and environment inside conditioner 215, the speed of the throughput of sheet S, the amount of substances deposited initially on the surface of sheet S and other operational conditions may be precisely controlled to achieve the desired result.

A monitoring device, such as a density sensor, a camera, or other optical sensor, or even various contact sensor devices may be provided to monitor the amount of the different substances on sheet S and also to monitor the thickness of the sheet during manufacturing to provide a sheet with the desired thickness and characteristics. This monitoring device preferably monitors sheet S coming out of oven 215 periodically and provides information useful in controlling aspects of the coating and curing process.

Furthermore, system 20 may be adapted to include more than two pans and the system adjusted so that the same system may be used to coat sheet S with different substances when desired. For example, roller 203 may be used to coat a different substance on sheet S and roller 217 adjusted accordingly so that sheet S may be made to bypass substance 211. In the alternative, if desired, only two pans may be used but a draining means provided to drain one substance from one of the pans and fill the pan with a different substance by means of a pump when a new coating substance is to be applied.

It shall be appreciated that the two sided coating system and method, as described in various embodiments herein, provides better release properties by precisely controlling the amount of the release agent and keeping it on the first surface, to allow the second substance to soak sheet S and therefore improving the release since more of the release agent is on the surface. Thus, it is easier to separate the laminate assemblies after pressing. Furthermore, in various embodiments, by impregnating sheet S with a greater quantity of the phenolic resin, it is easier to make the release agent stay on the surface of sheet S, thus eliminating the need to sand more of the sheet than necessary to remove all of the release agent. This reduces the cost by eliminating undesired wastage of material. Moreover, the sheet providing the release properties is also providing the structural cross linking due to the presence of phenolic resin in various embodiments. Thus, better structural cross linking is provided as migration of phenolic resin from an adjoining sheet is not the sole source of the structural bonding of this sheet of the laminate assembly.

The invention as described in the various embodiments above eliminates the need to use a release sheet during the pressing of the laminate assemblies in the manufacturing phase of a laminate. Thus, substantial cost savings in terms of raw material costs, handling costs, wastage, etc. may be achieved by the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for producing a sheet for a laminate product comprising the steps of:
    coating a first side of a kraft paper sheet with a release agent, said release agent remaining substantially on a surface of said first side leaving a second side of said kraft paper sheet uncoated by said release agent and said kraft paper sheet substantially unpenetrated by said release agent; and
    coating an opposite side of said kraft paper sheet and penetrating said kraft paper sheet with phenolic resin, leaving said first side of said kraft paper sheet unpenetrated by said phenolic resin.

2. The method of claim 1 wherein said release agent is sodium alginate.

3. The method of claim 1 wherein said first coating step comprises the step of:
    engaging said kraft paper with a first coater to coat said first side of said kraft paper with a controlled amount of said release agent.

4. The method of claim 3 wherein said first coating step further comprises the step of:
    engaging said kraft paper with a first metering device to remove from said first side an amount of said release agent determined to leave a desired amount of said release agent on said first side, and to further maintain said release agent substantially on said surface of said first side of said kraft paper.

5. The method of claim 3 wherein said second coating step comprises the step of:
    engaging said kraft paper with a second coater to apply a controlled amount of said phenolic resin to said opposite side of said kraft paper.

6. The method of claim 5 wherein said second coating step further comprises the step of:
    engaging said kraft paper with a second metering device to remove from said opposite side an amount of said phenolic resin determined to provide a desired level of penetration of said kraft paper by said phenolic resin from a remaining portion of said controlled amount of said phenolic resin on said second side.

7. The method of claim 6, further comprising the step of:
    adjusting a period said kraft paper engages said first coater, as well as a period said kraft paper engages said second coater, for application of said release agent substantially to said surface of said first side of said kraft paper and penetration of said phenolic resin into said kraft paper.

8. The method of claim 1, further comprising the step of:
    exposing said kraft paper to a conditioning unit to contemporaneously condition said release agent and said phenolic resin.

9. The method of claim 8 wherein said exposing step comprises the step of:
    adjusting a period said kraft paper is exposed to a conditioning unit to allow proper conditioning of said release agent and said phenolic resin by said conditioning unit.

10. The method of claim 8 wherein said adjusting step comprises the step of:
    controlling a first conditioning attribute during said exposure to maintain said release agent substantially on said first surface of said kraft paper.

11. The method of claim 10 wherein said first conditioning attribute is selected from the group consisting of:
    temperature;
    pressure;
    a catalyst; and
    moisture level.

12. The method of claim 8 wherein said exposing step further comprises the step of:
    controlling a second conditioning attribute during said exposure to prevent seepage of said phenolic resin onto said first surface of said kraft paper.

13. The method of claim 8 wherein said exposing step further comprises the step of:
    controlling a conditioning attribute during said exposure to control penetration of said phenolic resin into said kraft paper.

14. The method of claim 13 wherein said conditioning attribute is selected from the group consisting of:
    temperature;
    pressure;
    a catalyst; and
    moisture level.

15. The method of claim 8 wherein said exposing step further comprises the step of:
    controlling a conditioning attribute during said exposure to substantially prevent seepage of said release agent into said kraft paper.

16. The method of claim 15 wherein said conditioning attribute is selected from the group consisting of:
    temperature;
    pressure;
    a catalyst; and
    moisture level.

17. The method of claim 8 wherein said exposing step comprises the step of:
    controlling a rate at which said kraft paper is exposed to said conditioning unit; and
    maintaining a conditioning attribute of said conditioning unit to control penetration of said phenolic resin into said kraft paper, and maintaining said desired amount of said release agent substantially on said surface of said first side of said kraft paper, wherein said conditioning attribute is selected from the group consisting of:
    temperature;
    pressure;
    a catalyst; and
    moisture level.

18. The method of claim 8 wherein said conditioning unit is selected from the group consisting of an oven, a refrigeration device, a wetting device, and a drying device.

19. The method of claim 1, further comprising the step of:
    determining an amount of said release agent to be applied to said first side of said first kraft paper to allow a desired amount of said phenolic resin to penetrate said kraft paper.

20. The method of claim 19, further comprising the step of:
   determining an amount of said phenolic resin to be applied to said second side of said first kraft paper to penetrate said kraft paper without adversely affecting said release agent by contaminating said release agent.

21. The method of claim 19, further comprising the step of:
   determining an amount of said phenolic resin to be applied to said second side of said first kraft paper to penetrate said kraft paper without adversely affecting said release agent by repelling said release agent.

22. The method of claim 1, further comprising:
   determining a ratio of said release agent and said phenolic resin to be applied to said kraft paper to allow a suitable release of said first surface from another surface when processed and to prevent said phenolic resin from seeping through to said first surface of said kraft paper.

23. The method of claim 22 wherein said ratio of said release agent and said phenolic resin to be applied to said first and second sides respectively of said first kraft paper is approximately 1:2.

24. The method of claim 1 wherein said release agent is applied to said first side before said phenolic resin is applied to said second side to prevent said phenolic resin from penetrating said kraft paper beyond a desired level.

25. The method of claim 1 wherein said release agent is applied to said first side before said phenolic resin is applied to said second side to prevent said phenolic resin from impregnating said kraft paper and repel said release agent when applied.

26. The method of claim 1 wherein said phenolic resin provides mechanical bonding with a sheet of laminate material to be included in said laminate product and said release agent provides release characteristics from a second laminate product.

27. A method for manufacturing a sheet for a laminate product, comprising the steps of:
   coating a first surface of a sheet of kraft paper with a release agent, said release agent remaining substantially on said first surface of said kraft paper and providing release characteristics to said sheet; and
   coating a second surface of said sheet with a phenolic resin penetrating into said kraft paper, leaving said first surface of said kraft paper sheet unpenetrated by said phenolic resin, said phenolic resin providing bonding characteristics for bonding said sheet with another sheet of laminate material to be included in said laminate product.

28. The method of claim 27 wherein said release agent is sodium alginate.

29. The method of claim 27, further comprising the step of:
   determining an amount of said release agent to be applied to said first surface of said first kraft paper to allow a desired amount of said phenolic resin to be absorbed by said kraft paper.

30. The method of claim 29, further comprising the step of:
   determining an amount of said phenolic resin to be applied to said second surface of said first kraft paper to saturate at least a portion of said kraft paper without adversely affecting said release agent.

31. A system for double sided coating a kraft paper sheet for use in the manufacture of a laminate product, comprising:
   a first coater, wherein said first coater contains a release agent providing release characteristics desirable during said manufacture of said laminate product, and wherein said first coater is adapted for coating a first surface of said kraft paper, sheet with said release agent;
   a first metering device adapted to remove a portion of said release agent from said first surface of said kraft paper sheet to thereby provide a precisely controlled amount of said release agent on said first surface;
   a second coater containing phenolic resin, said phenolic resin providing bonding characteristics desirable during said manufacture of said laminate product, and wherein said second coater is adapted for coating a second surface of said kraft paper sheet with said phenolic resin;
   a second metering device for removing a portion of said phenolic resin from said second surface of said kraft paper sheet to thereby provide a precisely controlled amount of said phenolic resin on said second surface for penetration into said kraft paper sheet, leaving said first surface of said kraft paper sheet unpenetrated by said phenolic resin; and
   means for curing said coated kraft paper sheet under controlled conditions to provide simultaneous curing of both said release agent and said phenolic resin.

32. The system of claim 31 wherein said release agent is sodium alginate.

33. The system of claim 31, further comprising:
   means for controlling a curing attribute of said means for curing to maintain said release agent substantially on said first surface of said kraft paper sheet.

34. The system of claim 31, further comprising:
   means for controlling a curing attribute of said means for curing to prevent said phenolic resin from seeping through to said first surface of said kraft paper sheet.

35. The system of claim 31 wherein said phenolic resin is applied to said second surface after said release agent is applied to said first surface of said kraft paper sheet to prevent said phenolic resin from saturating said kraft paper sheet and thereby preventing said release agent from remaining substantially on said first surface of said kraft paper sheet.

36. A kraft paper sheet used in manufacturing a laminate product, comprising:
   a first surface coated with a release agent, providing release characteristics desirable in manufacturing said laminate product and maintained substantially on said first surface of said kraft paper sheet; and
   a second surface coated with phenolic resin providing bonding characteristics during said manufacturing of said laminate product, said phenolic resin penetrating said kraft paper sheet up to a desired level with said first surface of said kraft paper sheet unpenetrated by said phenolic resin.

37. The kraft paper sheet of claim 36 wherein said release agent is sodium alginate.

38. The kraft paper sheet of claim 36 wherein said kraft paper sheet is positioned adjacent to at least a second kraft paper sheet with said second surface of said kraft paper sheet in contact with said second kraft paper sheet forming a first laminate assembly, wherein said first laminate assembly is positioned adjacent to a second laminate assembly such that said first surface of said kraft paper sheet is adjacent to a release agent coated surface of said second laminate assembly, and wherein said first and second laminate assembly combination is exposed to high pressure and the treated first laminate assembly is separable from the treated second laminate assembly.

* * * * *